United States Patent
Leake, Jr. et al.

(10) Patent No.: US 7,685,636 B2
(45) Date of Patent: Mar. 23, 2010

(54) SYSTEM, SERVICE, AND METHOD FOR ENABLING AUTHORIZED USE OF DISTRIBUTED CONTENT ON A PROTECTED MEDIA

(75) Inventors: Donald E. Leake, Jr., Vestal, NY (US); Jeffrey B. Lotspiech, Henderson, NV (US); Stefan Nusser, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 11/072,943

(22) Filed: Mar. 7, 2005

(65) Prior Publication Data

US 2006/0200865 A1  Sep. 7, 2006

(51) Int. Cl.
*H04L 9/10* (2006.01)
*H04L 9/38* (2006.01)

(52) U.S. Cl. .................. 726/20; 713/185; 713/193; 726/27

(58) Field of Classification Search ............. 380/281, 380/284, 227–228, 278–279, 286; 713/159, 713/170–171, 185, 193–194; 726/9, 20, 726/27–30
See application file for complete search history.

(56) References Cited

U.S. PATENT DOCUMENTS

| | | | |
|---|---|---|---|
| 5,337,357 A * | 8/1994 | Chou et al. .................... 705/56 |
| 6,289,455 B1 | 9/2001 | Kocher et al. | |
| 6,434,535 B1 | 8/2002 | Kupka et al. | |
| 6,523,113 B1 | 2/2003 | Wehrenberg | |
| 6,550,011 B1 | 4/2003 | Sims, III | |
| 6,563,805 B1 | 5/2003 | Ma et al. | |
| 6,567,793 B1 * | 5/2003 | Hicks et al. .................... 705/51 |
| 7,367,061 B2 * | 4/2008 | Tischer ........................ 726/27 |
| 2002/0023215 A1 * | 2/2002 | Wang et al. ................. 713/171 |
| 2002/0057799 A1 * | 5/2002 | Kohno ........................ 380/228 |
| 2002/0141582 A1 | 10/2002 | Kocher et al. | |
| 2002/0147683 A1 | 10/2002 | Capobianco | |
| 2003/0005318 A1 | 1/2003 | Epstein | |
| 2003/0081521 A1 | 5/2003 | Solomon | |
| 2003/0084332 A1 | 5/2003 | Krasinski | |
| 2003/0120946 A1 | 6/2003 | Epstein | |
| 2003/0126445 A1 | 7/2003 | Wehrenberg | |
| 2004/0133794 A1 | 7/2004 | Kocher et al. | |
| 2004/0255145 A1 * | 12/2004 | Chow ........................ 713/200 |
| 2005/0120125 A1 * | 6/2005 | Morten et al. ................ 709/231 |

OTHER PUBLICATIONS

"Philips Video Content Protection System," printed from the following URL: http://www.licensing.philips.com/vcps/, on Dec. 12, 2004.

* cited by examiner

*Primary Examiner*—Jung Kim
*Assistant Examiner*—Venkat Perungavoor
(74) *Attorney, Agent, or Firm*—Samuel A. Kassatly; Jon A. Gibbons; Fleit, Gibbons, Gutman, Bongini & Bianco P.L.

(57) ABSTRACT

A protected content distribution system utilizes media-based copy protection to support online distribution of protected content in a secure and legitimate fashion. Using a media-based copy protection scheme based on broadcast encryption, the protected content distribution system realizes online distribution of protected content such as, for example audio files, movies, etc, authorizing consumption of unlicensed content by transfer of a unique encrypted key to the protected media. This transaction is fast, involving the transfer of an encrypted binding key rather than the protected content. Content is enabled through a unique encrypted key on protected media accessed through a device separate from the media driver.

23 Claims, 12 Drawing Sheets

SYSTEM, SERVICE, AND METHOD FOR ENABLING AUTHORIZED USE OF DISTRIBUTED CONTENT ON A PROTECTED MEDIA

FIELD OF THE INVENTION

The present invention generally relates to a system for using broadcast encryption techniques to license encrypted protected content such as, for example, music, movies broadcast content (TV), games, ring tones, and ebooks, to individual users. More specifically, the present invention pertains to a method utilizing media-based copy protection to enabling a user to distribute copyrighted or protected content in a secure and legitimate fashion through superdistribution, an electronic wallet, or rental.

BACKGROUND OF THE INVENTION

The entertainment industry is in the midst of a digital revolution. Music, television, and movies are increasingly becoming digital, offering new advantages to the consumer in quality and flexibility. At the same time the digital revolution also comprises a threat since digital data can be perfectly and quickly copied. If consumers may freely copy entertainment content and offer that content on the Internet, the market for entertainment content would evaporate.

The rapid growth in the distribution of digital content over the Internet, such as MP3s and DivX encoded movies, is especially alarming to content owners. These highly controversial and unauthorized distribution channels have caused an increase in demand from the entertainment industry for methods to protect their multi-million dollar content. Developing a content protection system that offers content owners an end-to-end solution they can use to securely distribute their copyrighted content is becoming increasingly important as the amount of content shared across the Internet grows exponentially each year.

One conventional approach for distribution of electronic content over a network infrastructure uses prepaid media (reference is made to U.S. Pat. No. 6,434,535 B1). A user obtains a prepaid media that comprises a unique key. The user contacts a specified server with the unique key and a remaining balance of the prepaid media. If the media and the remaining balance are valid, the user can download to the media a selected item of protected content that has been encrypted with the unique key. However, this approach does not allow a user to obtain the protected content from sources other than the specified server nor does this approach provide a method for a user to obtain authorization to use an item of protected content obtained through an unauthorized source.

Recently, developments in consumer electronics have created an alternative to traditional digital rights management systems. New recording and playing devices that use this new method, known as CPRM (Content Protection for Recordable Media) technology, have reached the market. It is now possible to directly record content protected in CPRM to writable media. If the recording is prepared in a server, the client needs no special keys or tamper-resistance. This method of content protection utilizes broadcast encryption. Devices do not need to have a conversation to establish a common key. Recent advances in broadcast encryption have made it as powerful as public-key cryptography in terms of revocation power. Because of its one-way nature, broadcast encryption is inherently suited to protect content on storage.

Once the client receives the encrypted content using CPRM, the interaction between the content server and the client side module is complete. The server is now free to focus on other requests. On the client side, CPRM requires that the encrypted content be recorded onto a physical piece of media, such as a recordable optical disk. This recording is performed in such a way that the encrypted content can only be played by a compliant device while it is on that particular piece of media. Consequently, encrypted content copied to another physical piece of media cannot by played by a compliant device.

CPRM devices use the media key block and media ID located currently on blank DVD recordable disks to calculate a media unique key. The media unique key is used to encrypt title keys. In turn, the title keys encrypt the content stored on the DVDs. Encrypting the title keys in the media unique key causes the title keys to become cryptographically bound to the particular piece of physical media on which the content is burnt. This prevents the encrypted content from being decrypted and accessed from any other physical piece of media.

Although this technology has proven to be useful, it is desirable to present additional improvements. Conventional techniques for copy protection of protected content prevent the use of protected content through superdistribution, i.e., file-sharing. For example, a user has a licensed copy of a protected content such as a movie on a DVD. The user shares the content with another user such as a friend over the Internet. The friend copies the content to a protected media such as a DVD-RAM. Conventional copy protection techniques prevent the friend from playing the content. However, conventional copy protection techniques do not allow the friend to purchase a license for use of the acquired content. By limiting the response of the protected media to "do not play", conventional copy protection techniques limit the sale of protected content through channels such as superdistribution.

What is therefore needed is a system, a service, a computer program product, and an associated method for enabling consumers to distribute protected content using protected media in a secure and legitimate fashion. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for enabling authorized use of distributed content on a protected media. The present system utilizes media-based copy protection to support online distribution of protected content in a secure and legitimate fashion.

Using a media-based copy protection scheme based on broadcast encryption, the present system realizes online distribution of protected content such as, for example audio files, movies, etc. The protected content is also referenced herein as digital content, copyrighted content, or content. Currently, standards utilizing broadcast encryption comprise video content protection system (VCPS), content protection for recording media (CPRM) and advanced access content system (AACS). While the present system is described in terms of CPRM, it should be clear that the present system may be applied to, for example, any copy protection system utilizing broadcast encryption, or any content protection system that allows digital content to be encrypted and associated with physical media.

The present system enables media-based superdistribution of content in a secure and legitimate fashion. For example, a user owns a licensed copy of content such as a movie. The user shares that movie through the Internet with a friend. The friend copies the movie to a protected media such as, for example, a DVD-RAM. Conventional copy protection systems simply prevent the movie from playing because a "binding key" (a unique encrypted key) is not present on the protected media. In contrast, the present system directs the friend to one or more websites from which a license for use of the content may be purchased and the binding key obtained. In this manner, the present system allows superdistribution of content in a secure and legitimate fashion while protecting the rights of the content owner, enabling new marketing techniques for protected content through superdistribution.

The present system uses a simple transaction flow to a licensing server to enable authorized superdistribution of protected content. A user receives an item of unlicensed content and transfers that unlicensed content to a protected media. Alternatively, the user receives the protected media with the unlicensed content already on the protected media. The user attempts to play the unlicensed content on a media device. The media device directs the user to a website that presents one or more links to e-commerce businesses where a transaction can be performed to enable the unlicensed content. The unlicensed content is enabled through transfer over the Internet of an encrypted binding key to the protected media.

The unlicensed content is distributed outside of channels controlled by conventional content distributors. Consequently, the website provides a link from the user to an authorized distributor for that unlicensed content. A media device provides to the website a content ID for the unlicensed content. The website looks up a list of electronic retailers for that unlicensed content and presents that list to the user. The user can then select an electronic retailer based on personal preferences of the user. Because the user already has possession of the unlicensed content, this transaction involves only the transfer of an encrypted binding key. Consequently, the transaction is fast, requiring moderate bandwidth capability on the part of the server.

The user may be directed to the website through a link on a message presented by the player to the user, requiring the user to click on the link to navigate to the website. The media player may automatically launch the website for the user. The website may further operate as an e-commerce business from which the content may be purchased or rented. The superdistribution model allows operation of a peer-to-peer file-sharing service that enables users to swap content over a network in a secure and legitimate fashion. As an advantage, only one protection mechanism is required to protect the content during distribution and media-based playback.

In one embodiment, content is enabled through a binding key on a hardware copy protection device such as a dongle. This dongle model does not depend on the superdistribution model. In conventional terms, a dongle is a device that attaches to a computer and controls access to a particular application or other content by the user. In this embodiment, a protected media (further referenced herein as a protected media dongle) is used as the dongle. For example, a PC comprises an SD card adapter; the SD card acts as the protected media dongle. The protected content is bound through encryption to the protected media dongle that is required to be present when the protected content is enabled. The protected media dongle represents a physical token of a license to consume content. The license may represent purchase of the content, rental of the content, promotional give-away of the content, etc.

A user receives the protected content, for example, through a download, through an e-mail attachment, by copying from another media, etc. The protected content is copied onto a storage device such as, for example, a hard drive. An application or media player plays or otherwise "consumes" the content. To consume the content, the application requires a key. This key is encrypted and stored on the protected media dongle. Consequently, presence of the protected media dongle is required for the application to obtain and decrypt the key. The key can be obtained via the superdistribution model as described herein, or it can be acquired as part of a regular recording operation. In this manner, a user may have many copies of the content in many locations, but only be able to use or consume the copy that has access to the key on the protected media dongle. In this embodiment, content comprises any content that is consumed on a PC or other media player such as, for example, multimedia content, executable content such as games, etc. The key is distributed independently from the protected media dongle in encrypted form and bound to the protected media dongle using a binding mechanism.

An exemplary protected media dongle is a SD card. A conventional SD card has a storage capacity on the order of 64 MB, 258 MB, etc. While the SD card is too small to store, for example, an application, the SD card can store many different keys. A typical key is on the order of approximately 20 bytes. Consequently, an SD card with capacity of 64 MB can contain the keys for 3 million different items of content such as games, movies, applications, databases, video, audio, or any other type of content requiring secure distribution.

This embodiment leverages inexpensive copy protection features provided by protected media to protect any form of content on a PC. Rather than trying to protect content on the PC, this embodiment protects a key on the protected media dongle. Consequently, this embodiment extends copy protection capabilities of protected media to the PC and hard drives.

This embodiment further provides a portability feature in that content can be copied to another PC. However, a key on a protected media dongle is required for each copy being used at any one time; i.e., if a user has purchased a license for one copy of the content, only one copy of the content may be used at a time. For example, a user may have a vacation home. The user can make a copy of his entire library of video and audio files and store that copy in his vacation home. The user takes his protected media dongle with him to his vacation home and has access to that entire library. However, the content in his regular home cannot be played without the protected media dongle. Only one of the copies of the library can be played at any one time. The ability to play another copy of the library requires obtaining additional keys for the content of the library and storing those additional keys on another protected media dongle.

In another embodiment, the present system performs as an electronic wallet. The electronic wallet uses the protection capabilities of protected media to manage budget information. The budget information enables a predetermined number of transactions or a predetermined dollar value that can be spent on transactions. Protected content stored on the protected media is the available budget. The protected media manages a state of the budget, protecting the budget from being copied to other media. The protected media further protects the budget from being "rolled back"; i.e., preventing a user from making a copy of the electronic wallet at an initial value, consuming a portion of the electronic wallet, and the restoring the electronic wallet with the backup to the initial value.

The electronic wallet may be purchased by a user or given to the user as, for example, a promotional give-away. Transactions performed using the electronic wallet can be anonymous on the part of the user or may comprise information about the user. The value of the budget on the electronic wallet may be refilled through, for example, an online transaction.

The information regarding the value of the budget on the electronic wallet is stored on the electronic wallet rather than at a central processing system which allows the protected wallet to be used in a disconnected environment. To add value to an electronic wallet, a server requires access to the electronic wallet through, for example, a network such as the Internet.

An electronic wallet using protected media comprises copy protection and state management. Copy protection prevents duplication of the electronic wallet, eliminating a possibility of the user simply duplicating an electronic wallet unlimited times for unlimited access to the budget on the electronic wallet. State management prevents a user from restoring the budget of the electronic wallet with a copy of the electronic wallet to "roll back" the budget of the electronic wallet to a previous value.

For example, a user has received an electronic wallet loaded with an initial credit of three plays as a promotion. The user may then download a protected movie and use the balance managed on the electronic wallet to play the content three times. The user, in an attempt to obtain more plays of the movie than allowed by the promotion, makes a copy of the electronic wallet with three plays in the budget of the electronic wallet. The protected media comprises a key that is required to operate the electronic wallet and thus operate the movie. When the contents of the electronic wallet are copied to any other form of media, the key from the protected media is not available to the electronic wallet; consequently, the copy of the electronic wallet is not functional.

In another attempt to obtain more plays of the movie than allowed by the promotion, the user plays the movie three times and then attempts to back up the electronic wallet with the copy of the electronic wallet previously made.

A balance available on the electronic wallet is decremented by an application that has recording capabilities. In one embodiment, decrementing the balance is performed by the application provided the application has access to encrypted keys for modifying the electronic wallet. In another embodiment, decrementing the balance is performed online using a server with access to encrypted keys for modifying the electronic wallet. Even if the electronic wallet is modified by a server online, an electronic wallet purchased with cash requires no personal information from the user. The transaction can be anonymous because the presence of the electronic wallet in a form of protected media is sufficient validation for the budget on the electronic wallet. Consequently, the electronic wallet leverages copy-protection features of inexpensive protected media that enables anonymous transactions in an anonymous fashion.

The state of the electronic wallet represents any value that can be decremented by the present system. Further the state of the electronic wallet may be incremented by a transaction with, for example, an authorized server or an authenticated application. Any application can "reload" the electronic wallet provided the application has the necessary device keys to write to the protected media.

The electronic wallet can be used for generational management of content, limiting the number of copies a user may make of the content. The electronic wallet can be used to provide a user with a number of purchases or a value of purchases from either an e-business or standard retailer with access to the Internet for purchases.

In a further embodiment, the present system performs as a protected media subscription container. During the subscription process, a media ID on a protected media designates the protected media as a rental media associated with a specific user. The user can copy content to the rental media from a rental service either remotely or locally. As an example, the user may download content from the rental service to the rental media via the Internet. The user may further copy content to the rental media locally from a device such as a kiosk in a rental retailer.

The rental media is a "container" for rented content. The terms of the subscription can, for example, limit the user to possession of three items of content at any time. To obtain possession of another item of content, the user writes over one of the three items of content in the rental media. The user is allowed unlimited downloads to a rental media that is registered with the provider of the rented content. However, the user is limited to possession of a predetermined number of items of rented content at any one time. Alternatively, the maximum number of concurrent rentals might be enforced by the capacity of the media itself. In this scenario, the user has unlimited downloads to the media registered as a rental container. However, since the capacity of the media is limited, the user will have to overwrite old content when downloading new one.

The present system uses the unique identification of protected media to provide a secure and legitimate method for operating a content rental business without a need for a trusted clock to limit a time window in which the content may be consumed. Further, the subscription rental model allows use of Internet downloads of content in a secure and legitimate manner, eliminating a need for mailing content to the user and back to the content rental business.

The present invention may be embodied in a utility program such as protected content distribution system utility program. The present invention also provides means for the user to obtain a license for consumption of protected content on a protected media. The user invokes the protected content distribution system utility program to enable use of the protected content after obtaining an encrypted key for the protected content. The present invention further provides means for the user to enable use or consumption of protected content on a media device through an encryption key stored on a protected media. The user invokes the protected content distribution system utility program to enable use of the protected media as a protected media dongle from a dongle media device external to a media device on which the protected content is operated. Furthermore, the present invention provides means for a user to obtain and consume a budget on the protected media. The user invokes the protected content distribution system utility program to manage the budget on the protected media. The present invention further provides means for a user to operate the protected media as a rental container. The user invokes the protected content distribution system utility program to manage a rented protected content on the protected media.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Content: copyrighted media such as, for example, music, movies, audio files, video files, e-books, databases, applications, games, etc., presented in a digital format on electronic devices.

Dongle: A device that attaches to a computer to control access to a particular application or item of protected content.

Internet: A collection of interconnected public and private computer networks that are linked together with routers by a set of standard protocols to form a global, distributed network.

Protected media: Any form of media having a copy-protection technology such as, for example, secure MMC, a flash memory card, a secure digital memory card (SD card), a digital versatile disk with random access memory, a digital versatile disk with read/write capability (DVD-R/W, DVD+RW), and high definition digital versatile disk, and a hard disk digital versatile disc (HD-DVD), etc.

Superdistribution: Distribution of content from one user to another through channels other than as a sale from a commercial entity to a consumer, for example, when a user shares a copy of content with a friend. Examples of superdistribution comprise file-sharing schemes such as Napster®, Kazaa®, etc.

URL (Uniform Resource Locator): A unique address that fully specifies the location of a content object on the Internet. The general format of a URL is protocol://server-address/path/filename.

World Wide Web (WWW, also Web): An Internet client-server hypertext distributed information retrieval system.

Figure 1:
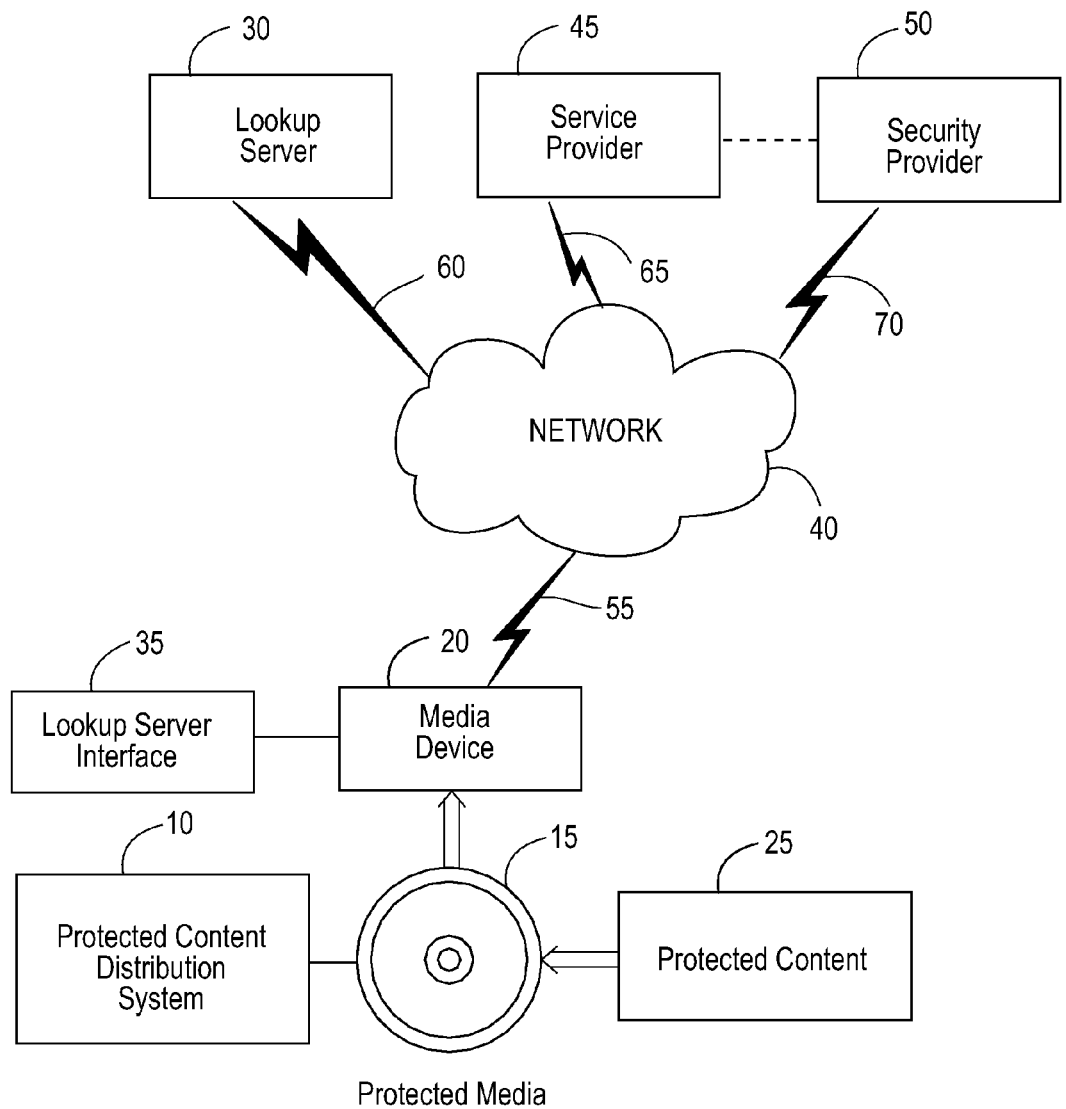
FIG. 1 is a schematic illustration of an exemplary operating environment in which a protected content distribution system of the present invention can be used for enabling use of protected content obtained through superdistribution.

FIG. 1 portrays an exemplary overall environment in which a system, a service, a computer program product, and an associated method ("the system 10") for distributing protected content using protected media according to the present invention may be used. System 10 includes a software programming code or computer program product that is typically embedded within, or installed on a media device 20.

A media device 20 can read and write to the protected media 15. The media device 20 is any device that can play or execute protected content 25 on the protected media 15. A user receives the protected content 25; the protected content 25 is an unauthorized copy of copyrighted digital content. For example, the user may receive the protected content 25 by downloading the protected content 25 from a file-sharing website, as an attachment in an e-mail, etc. The user copies the protected content 25 onto an empty protected media 15. Alternatively, the user may receive the protected media 15 from another source with the protected content 25 already on the protected media 15.

The user attempts to play the protected content 25 on the protected media 15 in the media device 20. To play, read, execute, or otherwise consume the protected content 25, the media device requires an encrypted key on the protected media 15 which is bound to that particular piece of media. In general, a bound encrypted key is present on protected media comprising authorized protected content, indicating that a user has received as a result of an authorized transaction rights to consume the protected content on that protected media.

When the media device 20 accesses the protected content 25 on the protected media 15, no valid encrypted key for this particular piece of media is found. The media device 20 accesses system 10 on the protected media 15. System 10 comprises a link such as a URL to a lookup server 30. The user accesses the lookup server 30 by means of a lookup server interface 35 and system 10. The media device 20 can access the lookup server 30 through a network 40.

System 10 provides to the lookup server 30 a unique identifier or a description of the protected content 25 comprising, for example, a title, an author, a composer, a producer, a rights owner, etc. The unique identifier could also consist of a cryptographic hash of the encrypted content. The lookup server 30 looks up retailers or other service providers that are authorized to sell a license for use of the protected content 25. The user selects one of the service providers using the lookup server interface 35 by, for example, selecting a link or URL.

The media device 20 can access a service provider 45 (an available source) through the network 40. The user completes a transaction with the service provider 45 that conveys to the user rights to consume the protected content 25 on the protected media 15. This transaction may take the form of a purchase, a rental, or a promotional event that allows the user to consume the protected content 25. The media device 20 can access a security provider 50 through the network 40. The media device 20 provides to the security provider 50 proof of the transaction with the service provider 45. In return, the security provider 50 provides to the user an encrypted key for the protected content 25 on the protected media 15. The encrypted key "binds" the protected content 25 to the protected media 15, enabling the user to consume the protected content 25 on the protected media 15 within the terms of the transaction with the service provider 45.

The media device 20 comprises software that allows the user to interface securely with the lookup server 30, the service provider 45, and the security provider 50. The media device 20 is connected to network 40 via a communications link 55 such as a telephone, cable, or satellite link. Lookup server 30 can be connected to network 40 via communications link 60. Service provider 45 can be connected to network 40 via communications link 65. Security provider 50 can be connected to network 40 via communications link 70. While system 10 is described in terms of network 40, the media device 20 may access the lookup server 30, the service provider 45, or the security provider 50 locally rather than remotely.

Figure 2A:
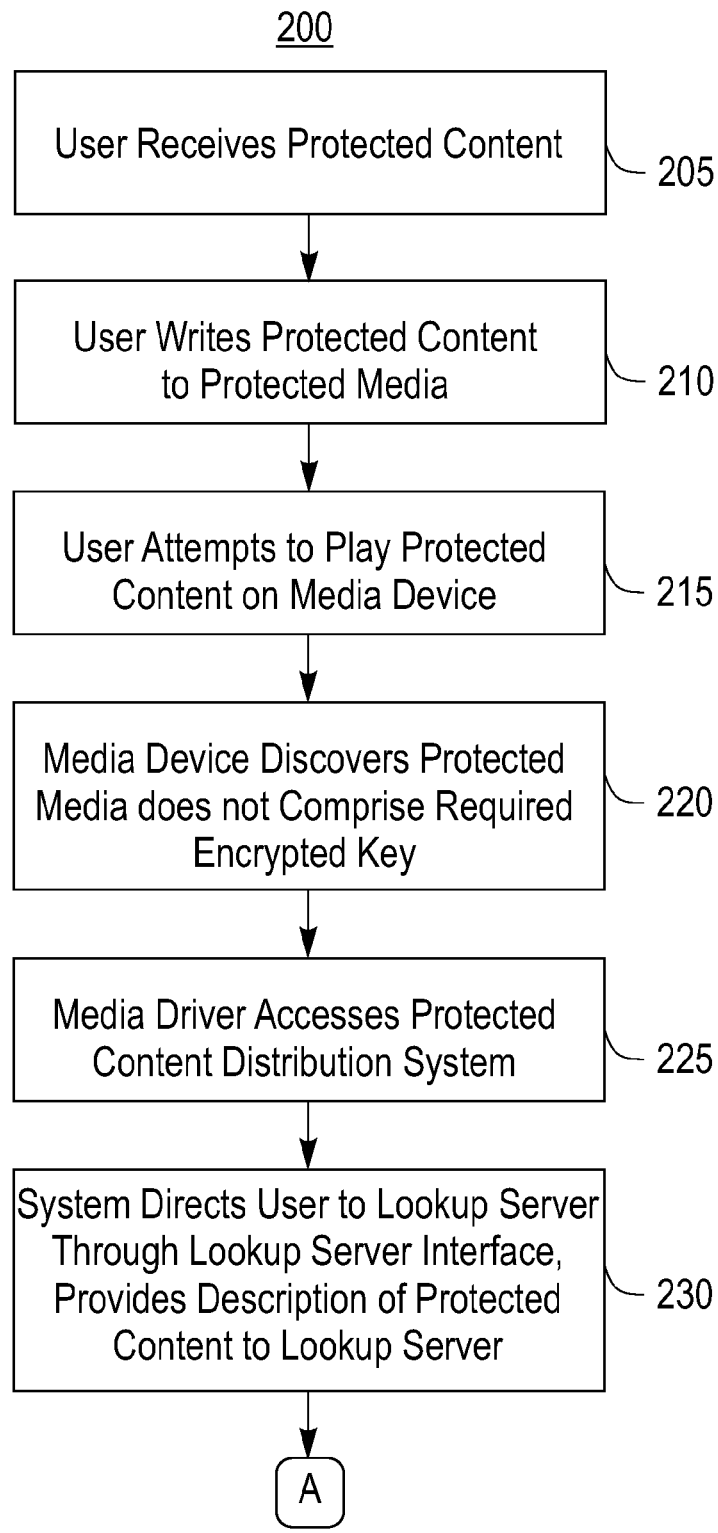
FIG. 2 is comprised of FIGS. 2A and 2B, and represents a process flow chart illustrating a method of operation of the protected content distribution system of FIG. 1 in licensing protected content obtained through superdistribution.
Figure 2B:
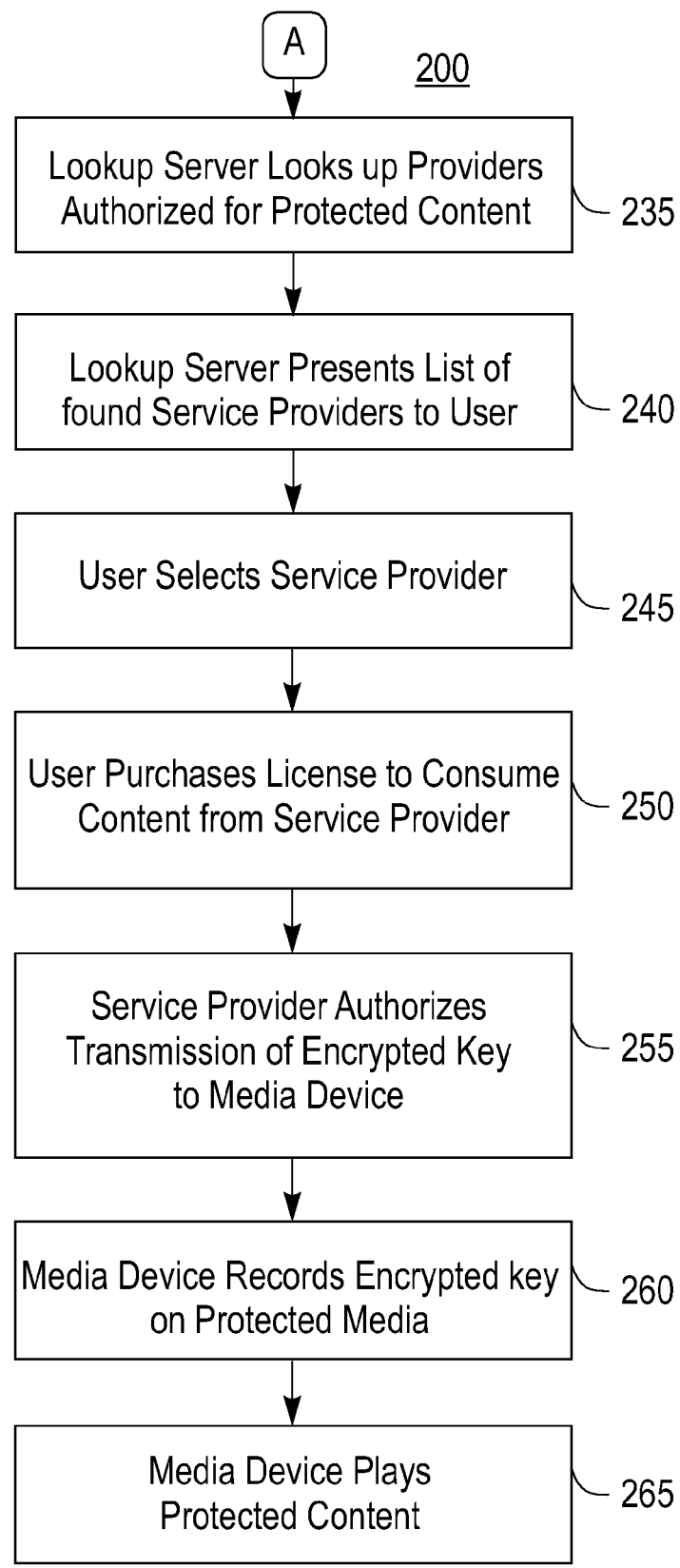

FIG. 2 (FIGS. 2A, 2B) illustrates a method 200 of system 10 in licensing protected content obtained through superdistribution. A user receives the protected content 20 (step 205) through some unauthorized method of distribution. The user writes the protected content 20 to the protected media 15 (step 210). The user attempts to play the protected content 20 on the media device 20 (step 215). The media device 20 discovers that the protected media 15 does not comprise a required encrypted key (step 220). The media device 20 accesses the protected content distribution system (system 10) (step 225). System 10 directs the user to the lookup server 30 through the lookup server interface 35 and provides the lookup server 30 with a description of the protected content 25 (step 230).

The lookup server 30 looks up retailers or other service providers such as service provider 45 authorized to sell, rent, or give away a user license for consumption of the protected content 25 (step 235). The lookup server 30 presents a list of found service providers to the user via the lookup server interface 35 (step 240). The user selects a service provider such as the service provider 45 by, for example, selecting a link to the service provider 45 (step 245). The user purchases, rents, or receives free of charge a license to consume the protected content 25 (step 250). The service provider 45 authorizes transmission of an encrypted key to the media device 20 (step 255). Authorization comprises providing a proof of purchase to the media device 20; the media device 20 provides the proof of purchase to the security provider 50 in exchange for the encrypted key. Alternatively the service provider 45 sends the proof of purchase directly to the security provider 50; the security provider 50 then transmits the encrypted key to the media device 20.

The media device 20 records the encrypted key on the protected media 15 (step 260). The encrypted key binds the protected content 25 to the protected media 15, requiring that the protected content 25 only be consumed from the protected media 15. The media player 20 plays the protected content 25 on the protected media 15 (step 265).

Figure 3:
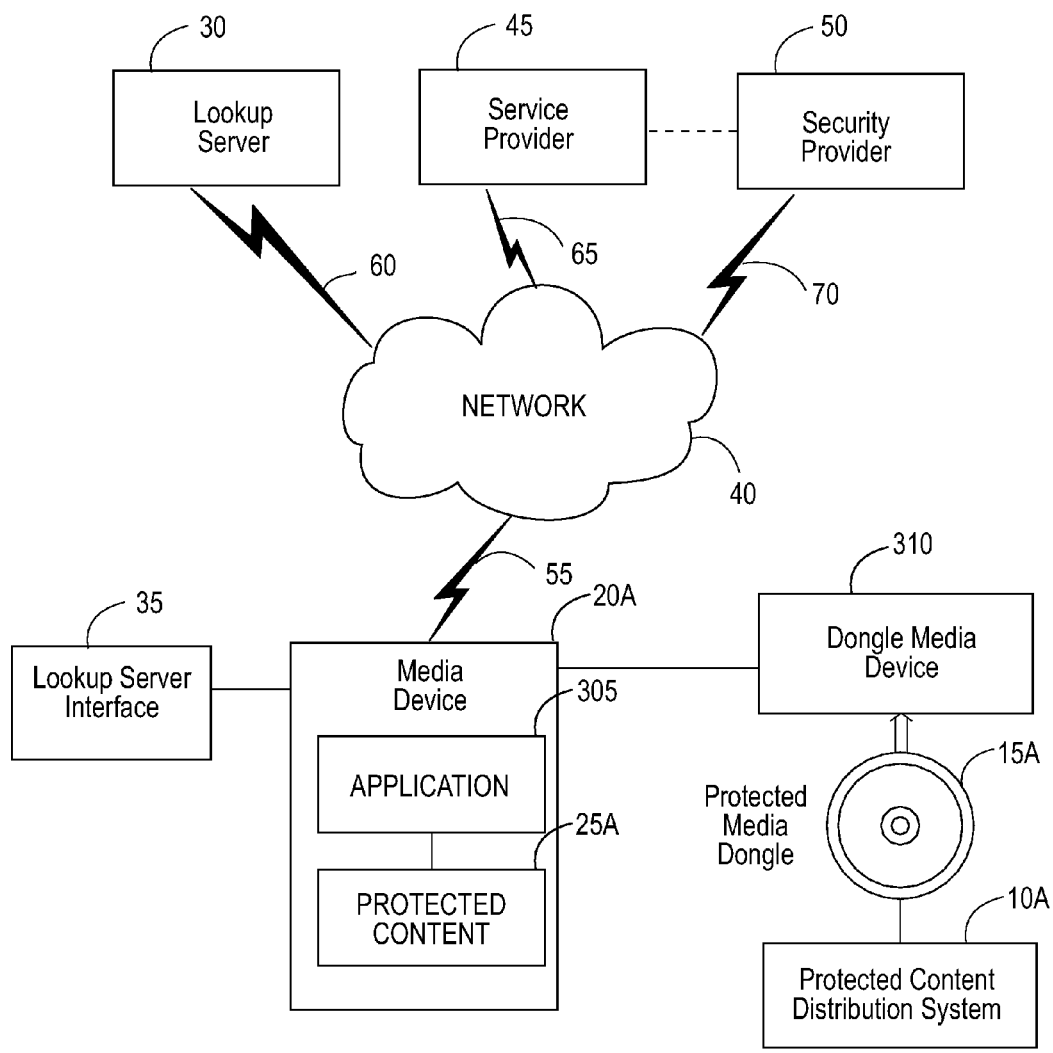
FIG. 3 is a schematic illustration of an exemplary operating environment in which a protected content distribution system of the present invention can be used for enabling the optional use of protected content through a protected media dongle.

FIG. 3 illustrates one embodiment of system 10, a system 10A (which is generally similar to system 10) in which a protected media 15A is used as a protected media dongle. It should be clear that the dongle model could be implemented independently from any other model described herein, such as the superdistribution model.

The protected media 15A is generally similar to the protected media 15. Protected media 15A is further referenced herein as protected media dongle 15A. Protected content 25A is stored on a media device 20A. The protected content 25A is generally similar to protected content 25. The media device 20A is generally similar to the media device 20. The media device 20A further comprises an application 305 for executing, playing, or otherwise consuming the protected content 25A. In this embodiment, the media device 20A is any device that can store and access protected content 25A and access information on the protected media dongle 15A through a dongle media device 310. An exemplary media device 20A is a personal computer.

System 10A stores an encrypted key for the protected content 25A on the protected media dongle 15A. To execute or otherwise operate the protected content 25A, the media device 15A requires access to the encrypted key for the protected content 25A. Consequently, the protected content 25A can only be consumed when the protected media dongle 15A is inserted in the dongle media device 310. An exemplary protected media dongle 15A is an SD card. An exemplary protected media dongle device 310 is an SD card reader/writer. The protected media dongle device 310 is any device that can read from and write to the protected media dongle 15A.

Figure 4:
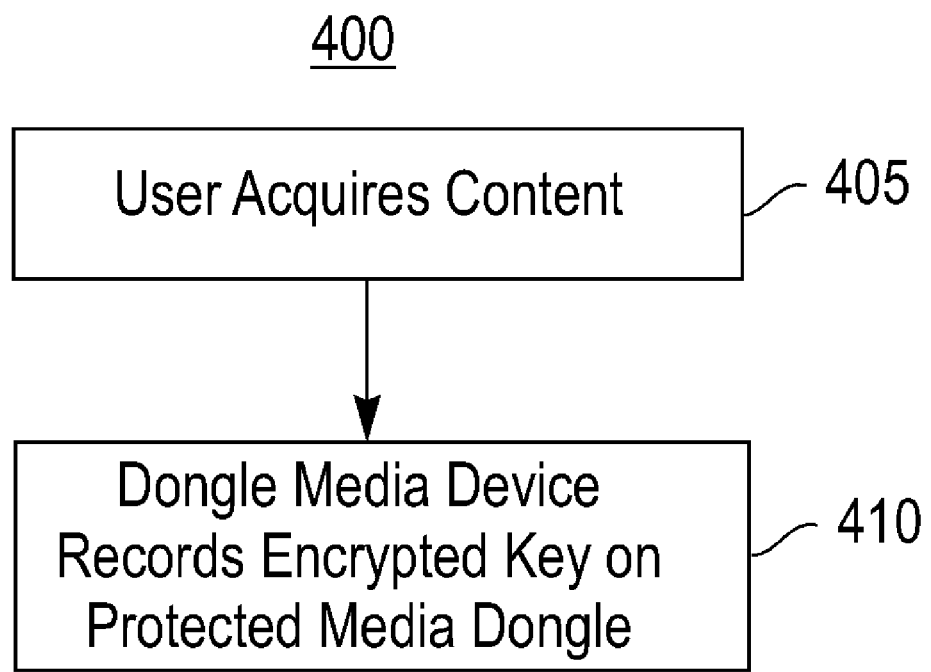
FIG. 4 is a process flow chart illustrating a method of operation of the protected content distribution system of FIG. 3 in using the protected media dongle of FIG. 3.

FIG. 4 illustrates a method 400 of system 10 in using a protected media dongle 15A to provide secure and legitimate use of protected content 25A stored on a media device 20A. A user acquires the protected content 25A (step 405). In the case of step 405, acquiring the protected content 25A comprises obtaining a license to consume the protected content 25A. This license may be obtained by downloading the protected content 25A in a transaction with an authorized source such as the service provider 45 for the protected content 25A. Alternatively, the license may be obtained for unauthorized content as described in FIG. 2 in step 205 through step 255. A result of the transaction with the service provider 45 is an encrypted key that enables the media device 15A to execute or otherwise consume the protected content 25A. The protected media dongle device 310 records the encrypted key on the protected media dongle 15A (step 410).

Figure 5:
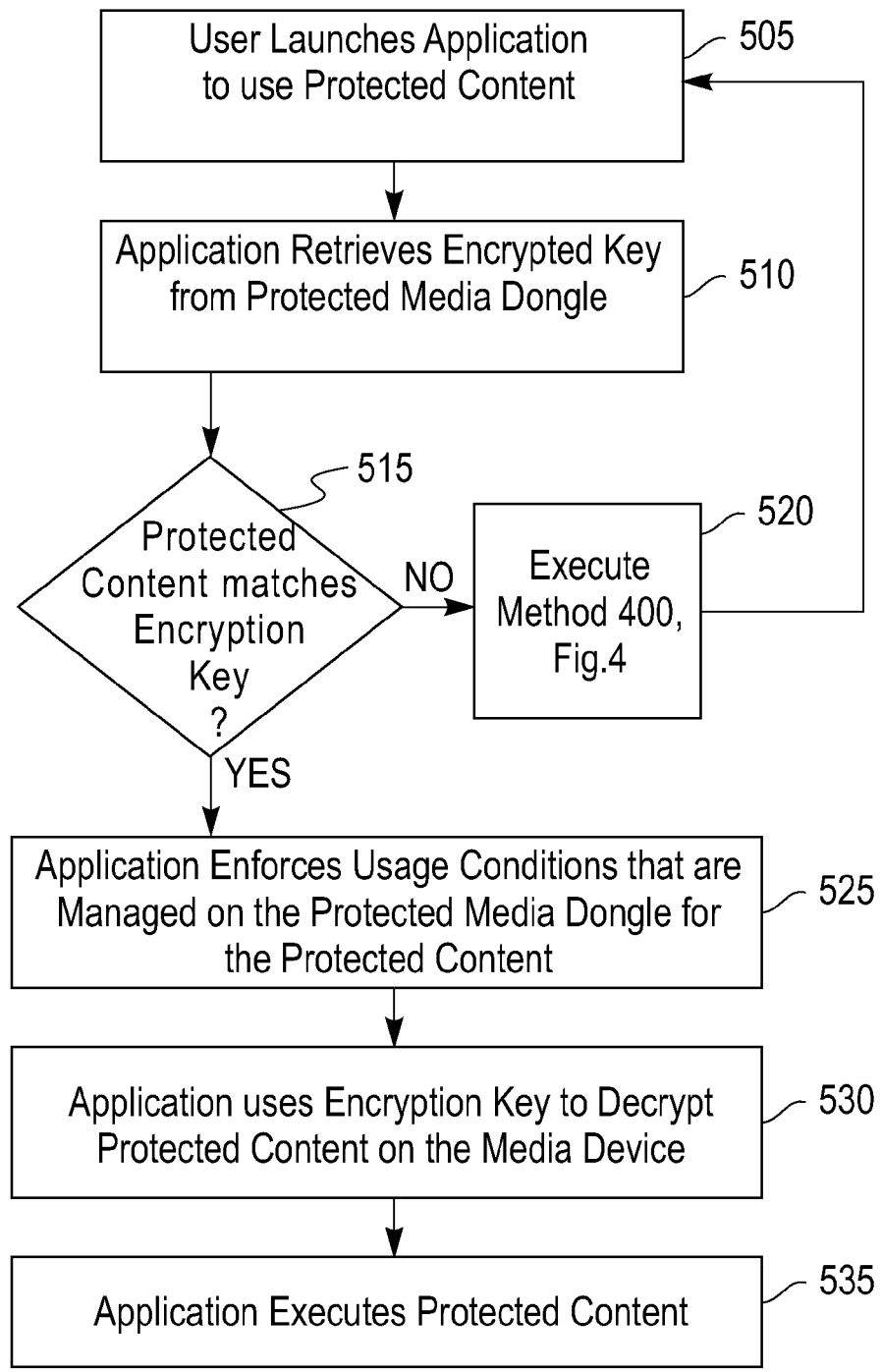
FIG. 5 is a process flow chart illustrating a method of operation of the protected content distribution system of FIG. 3 in consuming protected content.

FIG. 5 illustrates a method 500 of operation by application 305 executing, playing, or otherwise consuming the protected content 25A protected by an encrypted key stored on the protected media dongle 15A. A user launches application 305 to execute the protected content 25A (step 505). Application 305 retrieves an encrypted key for the protected content 25A from system 10 on the protected media dongle 15A (step 510).

Application 305 determines whether the protected content 25A matches the encryption key on the protected media dongle 15A (decision step 515). If the protected content 25A does not match the encryption key, the application executes method 400 illustrated in FIG. 4 to obtain an encryption key (step 520). Otherwise, the application 305 enforces usage conditions for the protected content 25A as managed by system 10 on the protected media dongle 15A (step 525). Usage conditions comprise, for example, a number of times the protected content 15A can be executed. Application 305 uses the encryption key to decrypt the protected content 15A on the media device 20A (step 530) and executes or otherwise consumes the protected content 25A (step 535).

Figure 6:
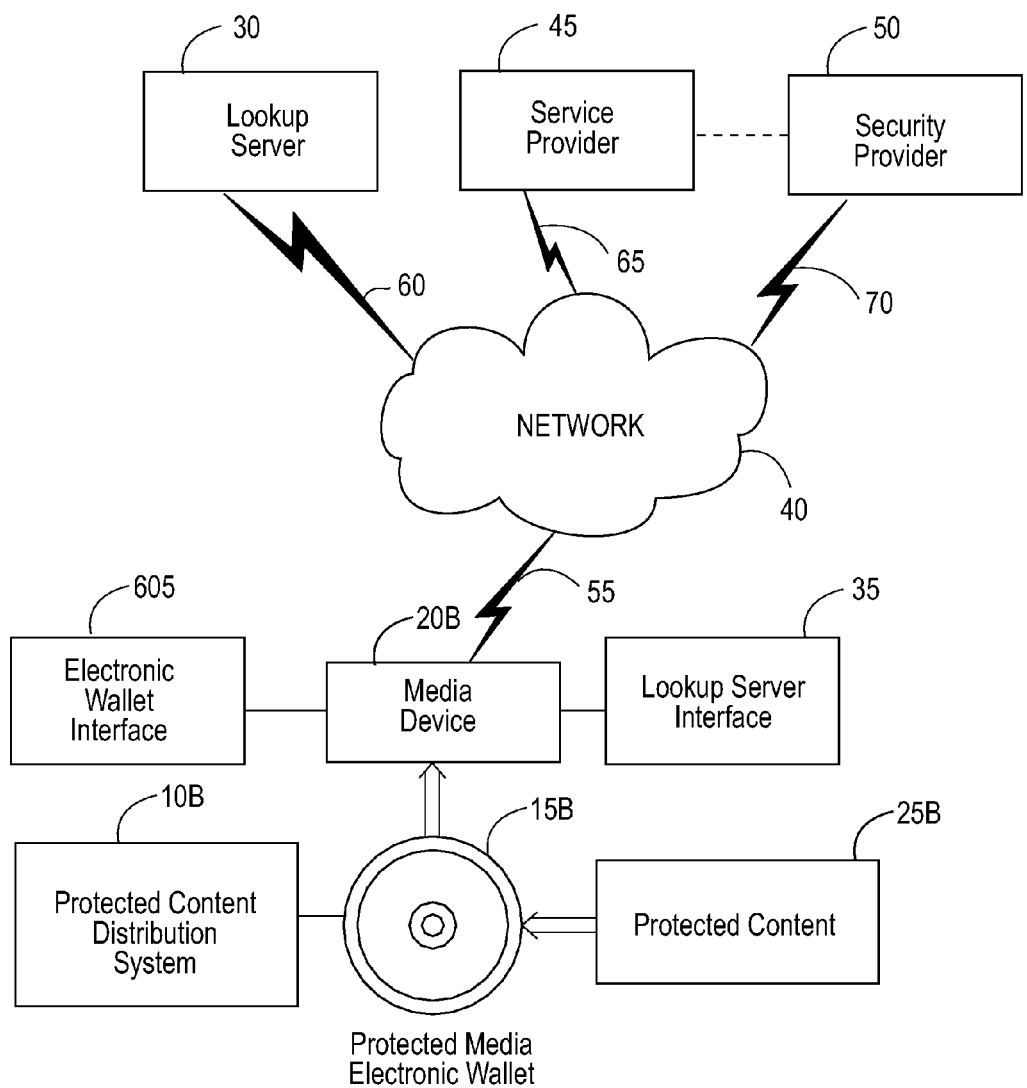
FIG. 6 is a schematic illustration of an exemplary operating environment in which a protected content distribution system of the present invention can be used as a protected media electronic wallet.

FIG. 6 illustrates another embodiment of system 10, a system 10B (which is generally similar to system 10 or 10A) in which a protected media 15B is used as an electronic wallet. The protected media 15B is generally similar to the protected media 15. Protected media 15B is further referenced herein as a protected media electronic wallet 15B. Protected content 25B is stored on a protected media electronic wallet 15B. The protected content 25B is generally similar to the protected content 25. The protected content 25B comprises a budget or a state that can be used by a user to purchase, rent, or otherwise obtain products such as, for example, copyrighted content. The protected media electronic wallet 15B comprises system 10B for maintaining the state or the budget of the protected media electronic wallet 15B.

Figure 7A:
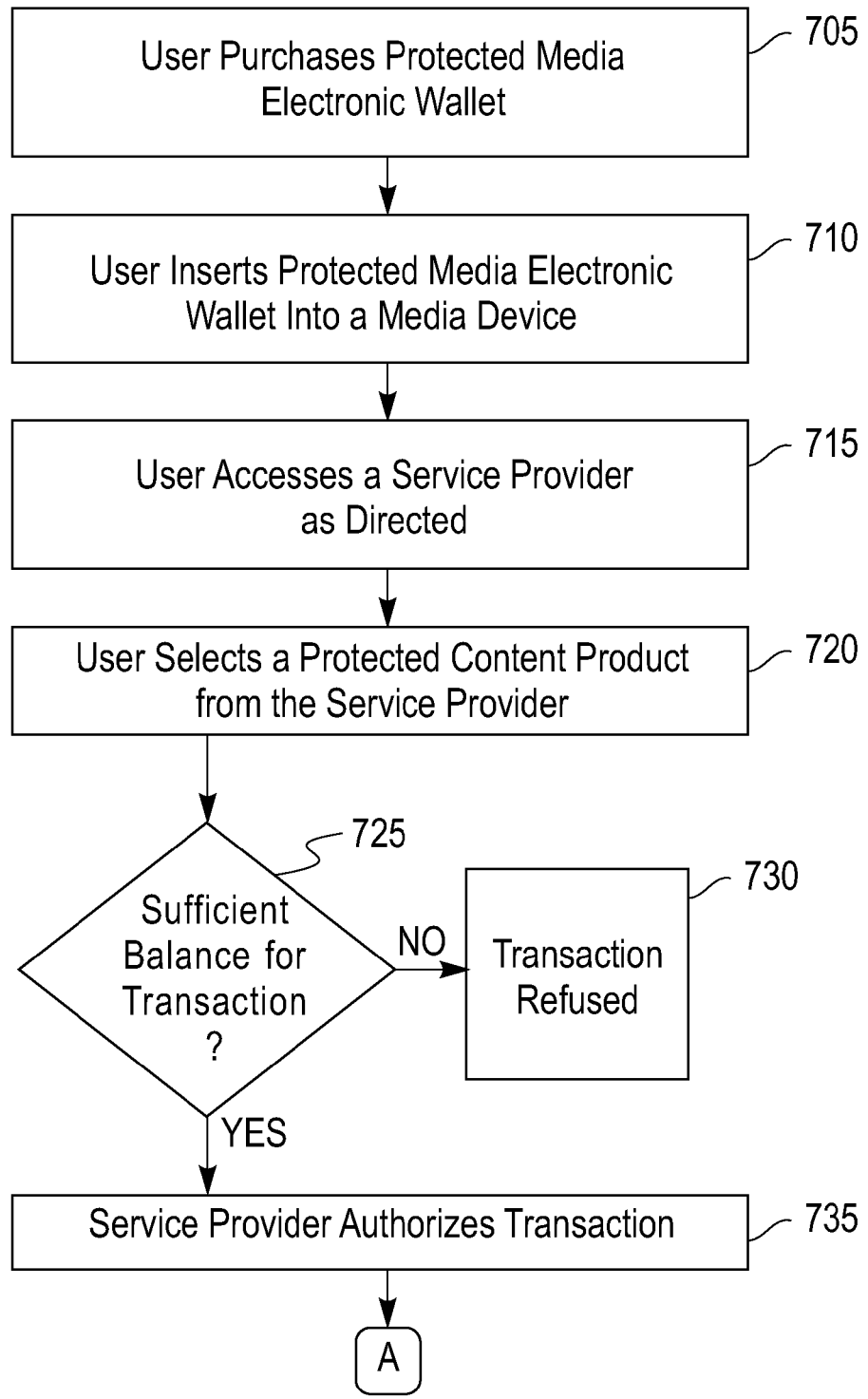
FIG. 7 is comprised of FIGS. 7A and 7B and represents a process flow chart illustrating a method of operation of the protected content distribution system of FIG. 7.
Figure 7B:
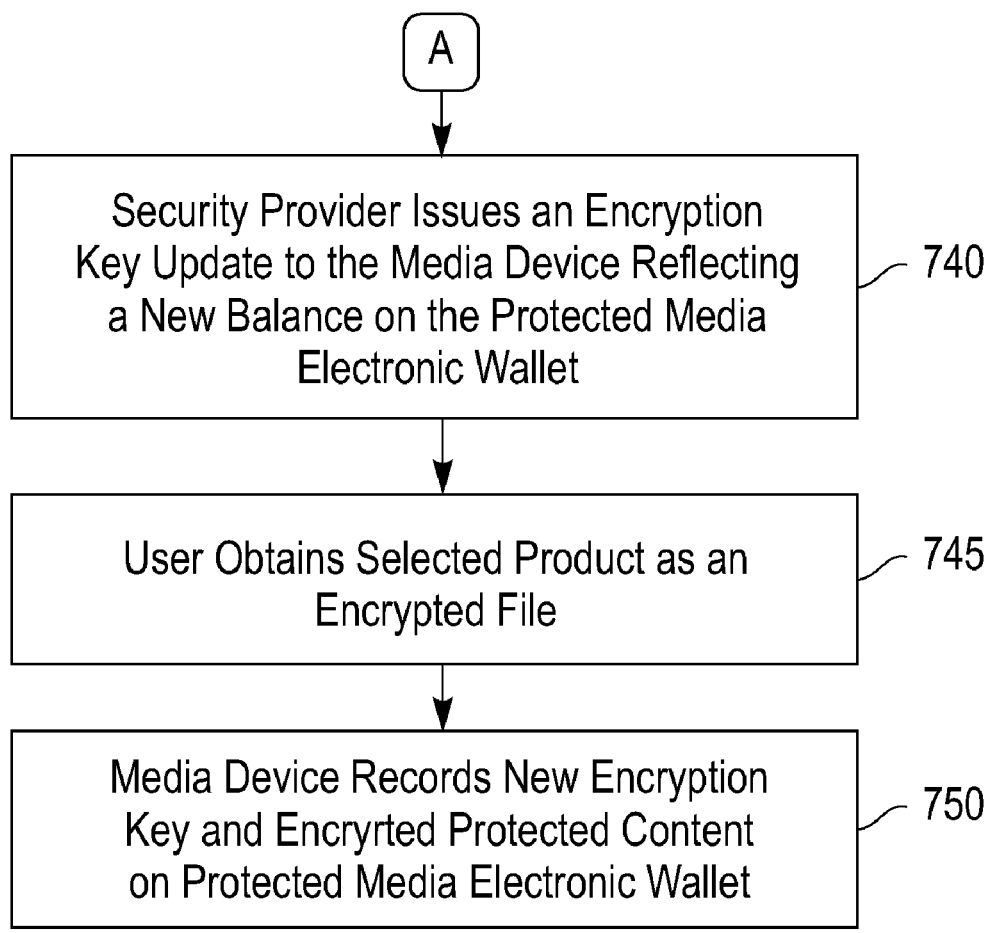

With further reference to FIG. 6, FIG. 7 (FIGS. 7A, 7B) illustrates a method 700 of system 10B on the protected media electronic wallet 15B. A user performs a transaction to obtain a protected media electronic wallet 15B preloaded with a predetermined budget (step 705). The transaction may comprise purchase, subscription, rental, or promotional giveaway. Alternatively, the user may select an initial budget or state for the protected media electronic wallet 15B at, for example, a kiosk in a retail store; a security provider in the kiosk burns the selected initial budget or state on the protected media electronic wallet 15B.

The user inserts the protected media electronic wallet 15B into a media device 20B (step 710). The media device 20B is generally similar to the media device 20. The media device 20B may be located, for example, in the retail store, at the home of the user, or some other location where the media device 20B has access to a service provider such as the service provider 45 and a security provider such as the security provider 50. The user accesses the service provider 50 as directed by system 10 on the protected media electronic wallet 15B (step 715) using, for example, a electronic wallet interface 605. The user selects a protected content product such as an application, an audio file, a video file, a movie, an electronic book, a database, etc. from products offered by the service provider 50 (step 720).

The service provider 45 determines whether sufficient value remains in the budget or state of the protected media electronic wallet 15B to complete the selected transaction (decision step 725). If no, the service provider 45 refuses the transaction (step 730). If yes, the security provider 50 authorizes the transaction (step 735). The security provider issues an encryption key update to the media device reflecting a new balance on the protected media electronic wallet 15B that reflects a value of the transaction (step 740).

The user downloads to the protected media electronic wallet 15B the protected content 25B as an encrypted file (step 745). The media device records new encrypted information reflecting a decremented value for the budget or state of the protected media electronic wallet 15B that reflects the transaction (step 750). The protected media electronic wallet 15B comprises the budget or state of the protected media electronic wallet 15B and the downloaded protected content 25B. The user may download additional downloaded protected content 25B until the budget or state of the protected media electronic wallet 15B is exhausted. The user may add to the value of the budget or state of the protected media electronic wallet 15B by performing a transaction with the service provider 45 and the security provider 50 using, for example, the electronic wallet interface 605. It should be clear that the downloaded protected content 25B may occur to a hard drive or to a different protected media, and that the wallet (i.e., budget data) and the actual content might not necessarily be combined on the same protected media.

Alternatively, the user may have already obtained the protected content 25B through other sources such as, for example, through superdistribution, and written the protected content to the protected media electronic wallet 15B. In this case, the user is obtaining an encrypted key for playing the protected content 25B, in a manner similar to the process described previously for FIGS. 1 and 2.

For example, the service provider 45 offers to customers an ability to purchase protected content using the protected media electronic wallet 15B. A user purchases the protected media electronic wallet 15B preloaded with 60 credits; the protected media electronic wallet 15B has a capacity of fifty songs. The protected media electronic wallet 15B comprises a media ID of 139. The service provider 45 sells a recently released song for six credits while other songs cost three credits. An exemplary list of songs from which the user may select for purchase is shown in Table 1.

TABLE 1

An exemplary list of songs for rental using the protected media electronic wallet 15B.

| Movie ID | Music Title | Credit Cost |
|---|---|---|
| 1 | Song A | 6 |
| 2 | Song B | 3 |
| 3 | Song C | 3 |

Table 2 illustrates a history of use for the protected media electronic wallet 15B by the user after purchase of three songs. The budget balance of the protected media electronic wallet 15B is decremented each time the user purchase a song according to the price of the song. The resulting balance is encrypted in the encryption key and written to the protected media electronic wallet 15B each time a song is purchased.

TABLE 2

An exemplary history of song purchase using the protected media electronic wallet 15B.

| Previous Balance | New Balance | Song ID |
|---|---|---|
| 60 | 54 | 1 |
| 54 | 51 | 3 |
| 51 | 48 | 2 |

Figure 8:
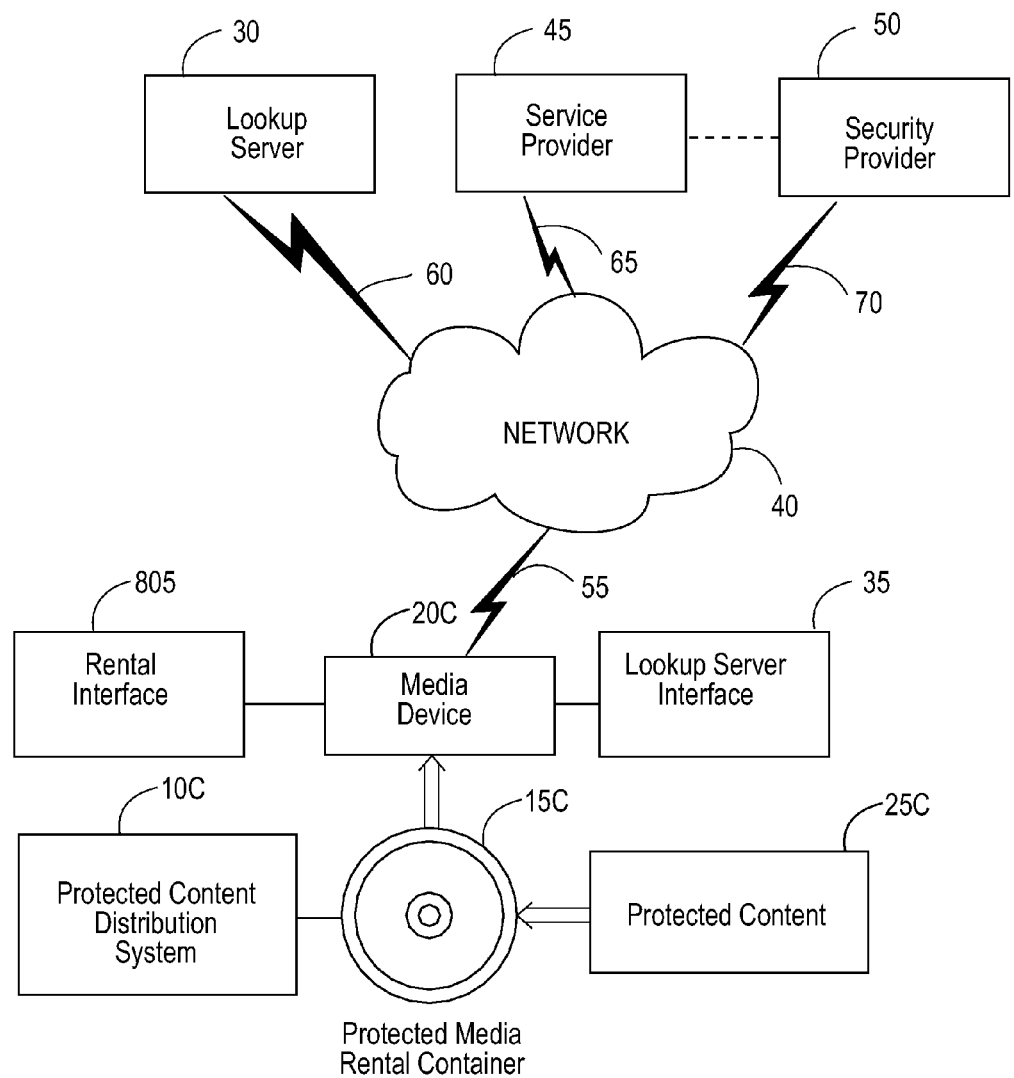
FIG. 8 is a schematic illustration of an exemplary operating environment in which a protected content distribution system of the present invention can be used as a protected media rental container.

FIG. 8 illustrates a further embodiment of system 10, a system 10C (which is generally similar to system 10) in which a protected media 15C is used as rental container. The protected media 15C is generally similar to the protected media 15. The protected media 15C is further referenced herein as a protected media rental container 15C. Protected content 25C is stored on the protected media rental container 15C. The protected content 25C is generally similar to the protected content 25. The protected media rental container 15C comprises a budget or a state that can be used to rent copyrighted content. The protected media rental container 15C further comprises system 10C for maintaining the state or the budget of the protected media rental container 15C.

Figure 9A:
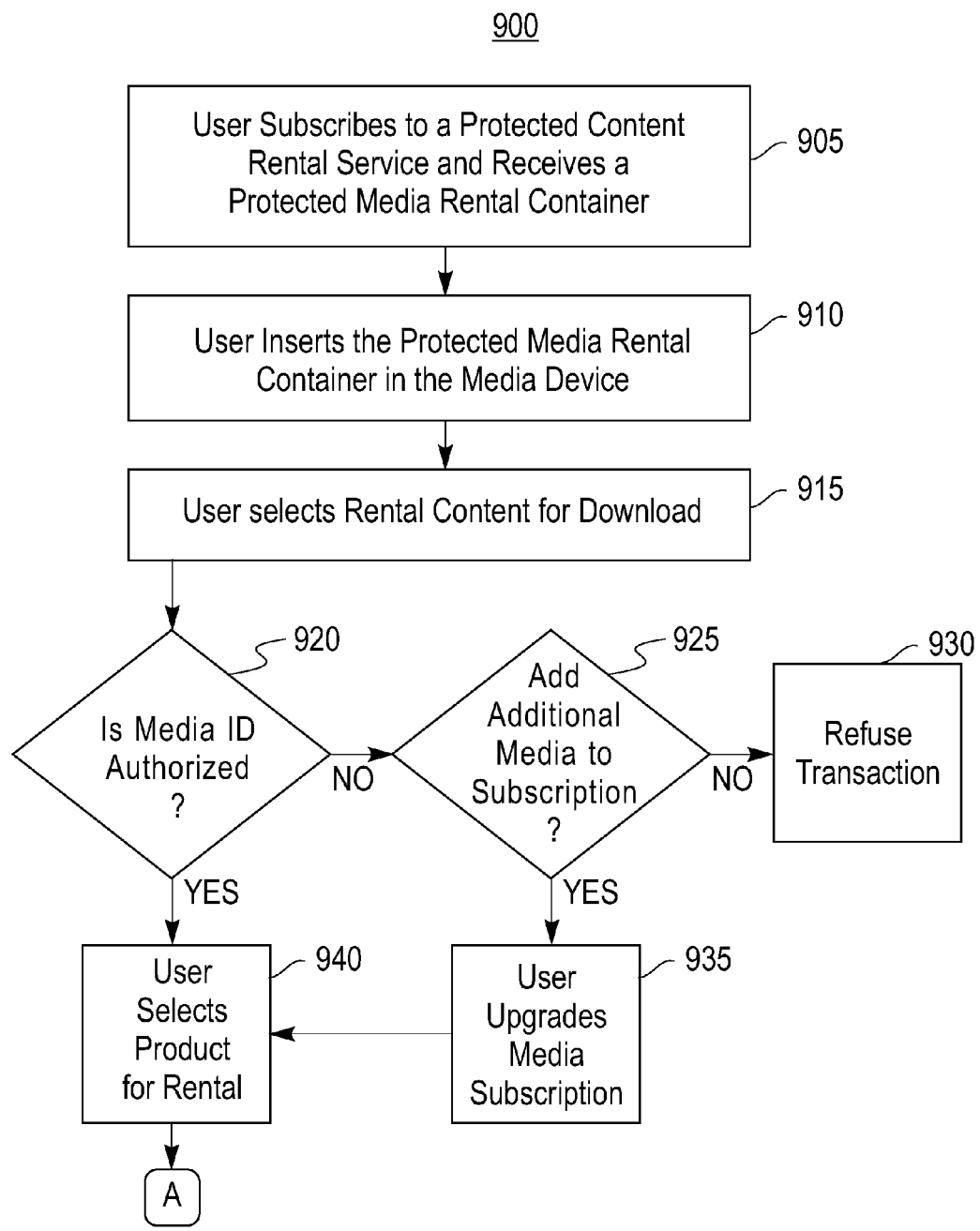
FIG. 9 comprises FIGS. 9A and 9B and represents a process flow chart illustrating a method of operation of the protected content distribution system of FIG. 1 operating as a protected media rental container for rental of protected content.
Figure 9B:
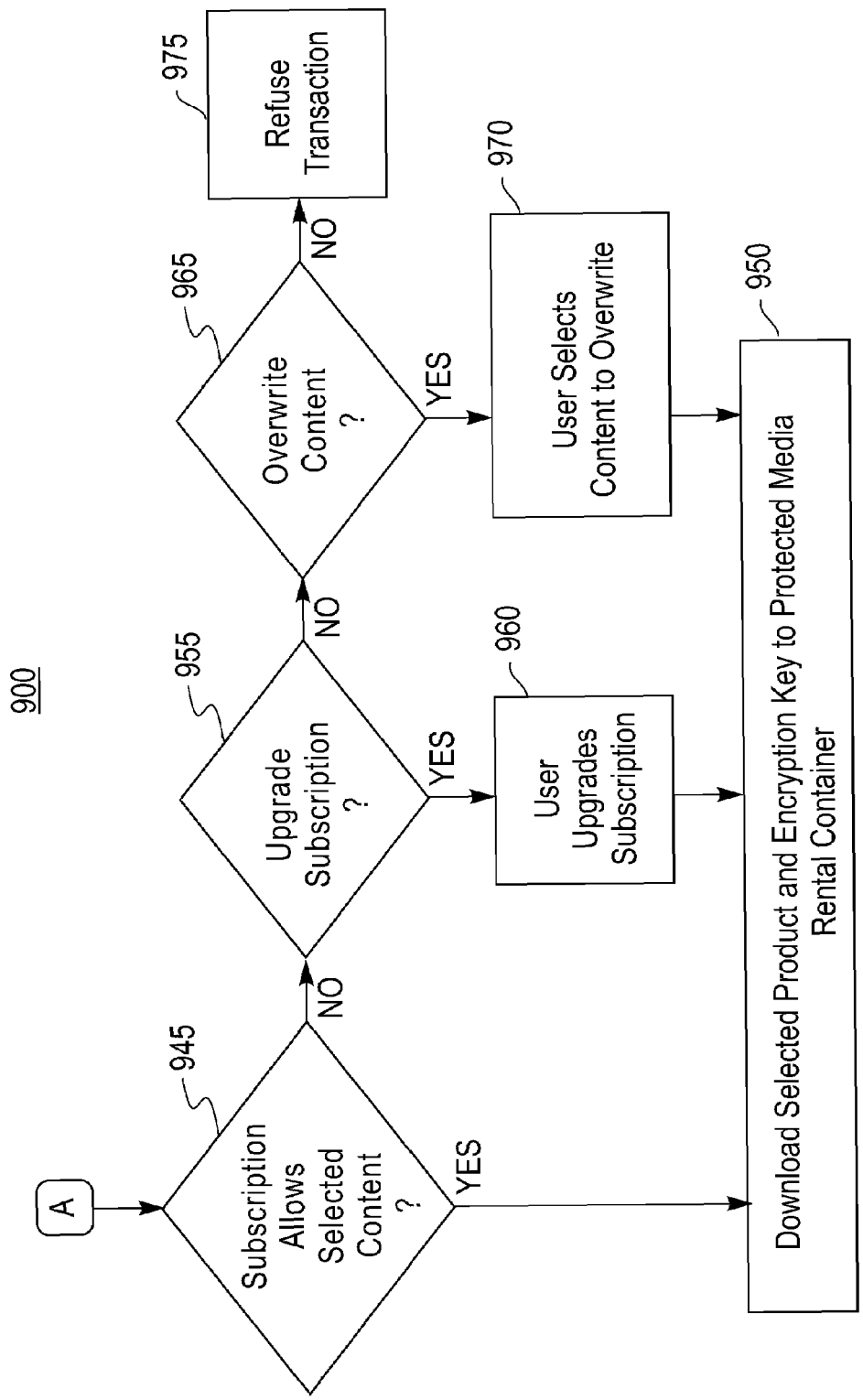

With further reference to FIG. 8, FIG. 9 (FIGS. 9A, 9B) illustrates a method 900 of system 10C on the protected media rental container 15C. A user subscribes to a protected content rental service and receives the protected media rental container 15C (step 905). The user inserts the protected media rental container 15C into a media device 20C (step 910). The media device 20C is generally similar to the media device 20. In a preferred embodiment, all that is needed to manage the particular rental offering is the media ID.

The user selects the rental content for download (step 915). The rental service may provide additional copies of the protected media rental container 15C to the user for an additional fee, as a part of the basic subscription, as a promotional give away, etc. An exemplary media table is illustrated in Table 4 listing exemplary media IDs for the copies of the protected media rental container 15C.

TABLE 4

Exemplary media table listing media IDs.
Media ID 123
456

The service provider 45 of the rental service determines if the media ID is authorized to rent the protected content 25C on the protected media rental container 15C currently inserted in the media device 20C (decision step 920). If the media ID is not authorized, the service provider 45 offers to add additional media to the subscription (decision step 925). If the user declines this offers, the service provider 45 refuses the transaction (step 930). If the user accepts the offer, the user enters a transaction with the service provider 45 and upgrades the media subscription to include the protected media rental container 15C currently inserted in the media device (step 935).

The user selects a product for rental (step 940). In addition, if the media ID is authorized (step 920), the user will be authorized to select the desired product for rental.

The product comprises, for example, copyrighted content such as a movie, an audio file, a video file, an electronic book, a database, a game, an application, etc. For example, the rental service may rent movies to a user that subscribes to the rental service. An exemplary list of movies available for rental is shown in Table 5.

TABLE 5

Exemplary movie table listing a movie ID for each of the movies available for rental from the rental service.

| Movie ID | Movie Title |
|---|---|
| 1 | Movie A |
| 2 | Movie B |
| 3 | Movie C |
| 4 | Movie D |

The user selects, for example, Movie C. The service provider 45 determines whether the subscription of the user allows rental of the selected product (decision step 945). For example, a subscription may allow a user to rent three movies at any one time. The protected media rental container 15C comprises three movies currently rented by the user. In this case, the user can upgrade his subscription to rent more movies on the protected media rental container 15C, select a movie on the protected media rental container 15C for overwriting by the newly selected movie, or cancel the transaction.

If the protected media rental container 15C comprises fewer than the maximum allowed number of products that may be rented at any one time, the subscription allows the selected product (decision step 945). The service provider 45 allows the media device 20C to download to the protected media rental container 15C the selected product and an encryption key prepared by the security provider 50. The encryption key comprises a media ID for each of the items of protected content allowed for consumption by the user on the protected media rental container 15C.

An exemplary table of movies and associated media ID rented by user ID "psuedo" is shown in Table 6. The user selects Movie D for downloading to the protected media rental container 15C with media ID 123. The subscription of the user allows rental of two movies at any one time on the protected media rental container 15C with media ID 123. The subscription does not allow the user to simply add Movie D to the protected media rental container 15C with media ID 123 (decision step 945).

TABLE 6

An exemplary list of movies and associated media ID rented by the user "pseudo" as of a specific date such as, for example, August 22.

| User ID | Media ID | Movie ID | Download Date |
|---|---|---|---|
| psuedo | 123 | 1 | August 15 |
| psuedo | 456 | 3 | August 15 |
| psuedo | 123 | 2 | August 22 |

The service provider 45 asks the user whether the user wishes to upgrade the subscription (decision step 955). If yes, the user enters a transaction with the service provider 45 and upgrades the subscription to allow the selected product (step 960) and processing proceeds to step 950. If the user does not wish to upgrade the subscription (decision step 955), the service provider 45 asks the user whether the user wishes to overwrite a movie on the protected media rental container 15C with media ID 123 with the new movie (decision step 965). If yes, the user selects a movie such as, for example, Movie A (Movie ID 1) for overwriting by the new movie (Movie D with movie ID 4) (step 970) and processing proceeds to step 945). If the user declines to select a movie for overwriting, the service provider 45 refuses the rental transaction (step 975).

It is to be understood that the specific embodiments of the invention that have been described are merely illustrative of certain applications of the principle of the present invention. Numerous modifications may be made to the system, service, and method for distributing protected content using protected media described herein without departing from the spirit and scope of the present invention. Moreover, while the present system is described in terms of CPRM, it should be clear that the present system may be applied to, for example, any copy protection system utilizing broadcast encryption. Further, while the present invention is described for illustration purpose only in relation to the WWW, it should be clear that the invention is applicable as well to, for example, to any network over which content may be distributed.

What is claimed is:

1. A method of enabling authorized use of distributed content on a protected media, the method comprising:

determining that a user is attempting to access protected content in possession of the user via a media device adapted to play the protected content, wherein the protected media resides on a protected media;

determining that the protected content fails to be bound with an encryption key associated with the protected media;

temporarily restricting, by the media device, access to the protected content in response to determining that the protected content residing on the protected media fails to be bound with the encryption key associated with the protected media;

accessing, by the media device in response to the temporarily restricting, link information on the protected media, wherein the link information is associated with a set of service providers that provide encrypted keys;

prompting, by the media device in response to the accessing, the user to select at least one service provider to obtain an encryption key;

receiving, in response to the prompting, an encryption key from the at least one service provider selected by the user;

binding, by the media device in response to the receiving, the protected content with the protected media using the encryption key that has been received; and granting, in response to the binding, access to the protected content.

2. A computer program storage product for enabling authorized use of distributed content on a protected media, the computer program product comprising instructions for:

determining that a user is attempting to access protected content in possession of the user via a media device adapted to play the protected content, wherein the protected media resides on a protected media;

determining that the protected content fails to be bound with an encryption key associated with the protected media;

temporarily restricting, by the media device, access to the protected content in response to determining that the protected content residing on the protected media fails to be bound with the encryption key associated with the protected media;

accessing, by the media device in response to the temporarily restricting, link information on the protected media, wherein the link information is associated with a set of service providers that provide encrypted keys, wherein accessing the link information comprises:

directing the user to a lookup server, and wherein prompting the user comprises displaying information associated with each of the service providers to the user; and sending a unique identifier associated with the protected content to the lookup server, for identifying a service provider for providing the encrypted key, wherein the unique identifier comprises an encrypted title key that is unique to the protected content;

prompting, by the media device in response to the accessing, the user to select at least one service provider to obtain an encryption key;

receiving, in response to the prompting, an encryption key from the at least one service provider selected by the user;

binding, by the media device in response to the receiving, the protected content with the protected media using the encryption key that has been received; and granting, in response to the binding, access to the protected content.

3. A system for enabling authorized use of distributed content on a protected media, the system comprising:

a media driver on a media device adapted to:

determine that a user is attempting to access protected content in possession of the user via the media device adapted to play the protected content, wherein the protected media resides;

determine that the protected content fails to be bound with an encryption key associated with the protected media;

temporarily restrict access to the protected content in response to determining that the protected content residing on the protected media fails to be bound with the encryption key associated with the protected media;

access, in response to access being temporarily restricted, link information on the protected media, wherein the link information is associated with a set of service providers that provide encrypted keys;

prompt, in response to link information being accessed, the user to select at least one service provider to obtain an encryption key;

receiving an encryption key from the at least one service provider selected by the user;

bind, by the media device in response to the receiving, the protected content with the protected media using the encryption key that has been received; and grant, in response to the protected content being bound with the protected media using the encryption key that has been received, access to the protected content.

4. A service for enabling authorized use of distributed content on a protected media, the service comprising:

a utility that is adapted to:

determine that a user is attempting to access protected content in possession of the user via a media device adapted to play the protected content, wherein the protected media resides;

determine that the protected content fails to be bound with an encryption key associated with the protected media;

temporarily restrict access to the protected content in response to determining that the protected content residing on the protected media fails to be bound with the encryption key associated with the protected media;

access, in response to access being temporarily restricted, link information on the protected media, wherein the link information is associated with a set of service providers that provide encrypted keys;

prompt, in response to link information being accessed, the user to select at least one service provider to obtain an encryption key;

receiving an encryption key from the at least one service provider selected by the user;

bind, by the media device in response to the receiving, the protected content with the protected media using the encryption key that has been received; and grant, in response to the protected content being bound with the protected media using the encryption key that has been received, access to the protected content.

5. The method of claim 1, wherein accessing the link information comprises directing a user to a lookup server, and wherein prompting the user comprises displaying information associated with each of the service providers to the user.

6. The method of claim 5, further comprising: sending a unique identifier associated with the protected content to the lookup server, for identifying a service provider for providing the encrypted key.

7. The method of claim 6, wherein sending comprises transmitting the unique identifier over a network.

8. The method of claim 6, wherein the unique identifier comprises an encrypted title key that is unique to the protected content.

9. The method of claim 6, wherein the protected content is encrypted; and wherein the unique identifier comprises a cryptographic hash of the encrypted content.

10. The method of claim 1, further comprising storing the encrypted key that has been received onto a protected media dongle that physically couples to a port on a system associated with the user and that is separate and distinct from the protected media.

11. The method of claim 10, wherein determining that the protected content fails to be bound with an encryption key associated with the protected media further comprises:

determining that the encryption key does not reside on the protected media dongle, and wherein granting access to the protected content further comprises:

determining that the encryption key that has been received from the at least one service provider has been stored on the protected media dongle.

12. The computer program storage product of claim 2, wherein prompting the user further comprises:
displaying a set of selectable links to the user, wherein each selectable link is associated with one of the service providers in the set of service providers.

13. The computer program storage product of claim 12, wherein the user initiates a transaction with the at least one service provider to obtain the encryption key by selecting a selectable link in the set of selectable links that is associated with the at least one service provider.

14. The computer program storage product of claim 13, wherein the transaction includes the user purchasing the encryption key.

15. The computer program storage product of claim 13, wherein the transaction includes the user renting the encryption key.

16. The computer program storage product of claim 13, wherein the transaction includes the user receiving the encryption key in exchange for a non-monetary consideration.

17. The computer program storage product of claim 2, further comprising storing the protected content on a hard drive.

18. The computer program storage product of claim 2, further comprising storing the protected content on a separate protected media.

19. The computer program storage product of claim 2, further comprising storing on the protected media a value indicative of a budget for acquiring at least the encrypted key from at least one authorized source.

20. The computer program storage product of claim 19, further comprising decrementing, in response to receiving the encryption key, the budget to reflect an acquisition of the encrypted key.

21. The computer program storage product of claim 2, wherein the protected media comprises a subscription container, wherein the subscription container authorizes use of a predetermined number of protected contents on the protected media based on a unique media identifier residing on the protected media that is associated with the user.

22. The computer program storage product of claim 21, wherein the subscription container enforces concurrent content objects restrictions on the protected media concurrently by tracking the concurrent objects based on the unique identifier, and wherein the subscription container further enforces removal of old content before recording new content to the protected media.

23. The computer program storage product of claim 21, wherein the subscription container enforces restrictions on a total number of concurrent content object allowed on the protected media based on a capacity of the protected media.

* * * * *